(12) United States Patent
Pettersson

(10) Patent No.: US 6,754,933 B1
(45) Date of Patent: Jun. 29, 2004

(54) HEATED WINDSHIELD WIPER

(76) Inventor: Dick Pettersson, Vaksalagatan 18A, 753 20 Uppsala (SE)

( * ) Notice: Subject to any disclaimer, the term of this patent is extended or adjusted under 35 U.S.C. 154(b) by 68 days.

(21) Appl. No.: 10/204,637

(22) PCT Filed: Nov. 22, 2000

(86) PCT No.: PCT/SE00/02292

§ 371 (c)(1), (2), (4) Date: Aug. 22, 2002

(87) PCT Pub. No.: WO01/38149

PCT Pub. Date: May 31, 2001

(30) Foreign Application Priority Data

Nov. 22, 1999 (SE) ............................................. 9904193

(51) Int. Cl.[7] .................................................. B60S 1/38
(52) U.S. Cl. ................................ 15/250.07; 15/250.08; 219/202
(58) Field of Search ......................... 15/250.05, 250.06, 15/250.07, 250.08, 250.09; 219/202, 203

(56) References Cited

U.S. PATENT DOCUMENTS

| | | | |
|---|---|---|---|
| 1,640,887 A | | 8/1927 | Davis ...................... 15/250.07 |
| 2,416,572 A | * | 2/1947 | Cordova .................. 15/250.08 |
| 2,469,791 A | | 5/1949 | Schneider ................ 15/250.07 |
| 2,786,224 A | | 3/1957 | Dembosky ............... 15/250.07 |
| 2,790,194 A | * | 4/1957 | Norine ..................... 15/250.07 |
| 2,923,022 A | * | 2/1960 | Theckston ............... 15/250.07 |
| 3,034,166 A | | 5/1962 | Bell ........................ 15/250.07 |

FOREIGN PATENT DOCUMENTS

DE    1 906 670    2/1969

* cited by examiner

Primary Examiner—Gary K. Graham
(74) Attorney, Agent, or Firm—Young & Thompson

(57) ABSTRACT

A heated wiper mechanism, arranged to prevent ice from building up on the articulated wiper arm structure of a vehicle windshield wiper carrying a flexible strip (1), the heater mechanism including an electrically supplied, heat radiating wire (9) supported on said windshield wiper, the heat radiating wire (9) being an integral, closed loop electrical resistance wire enclosed by a flexible tubing and being supported at a level near an upper, backside portion of the strip (1) for radiating heat to the articulated wiper arm structure. The wire (9) is supported by saddle-shaped clips (13) engaging the sectional profile of the backside portion of the strip (1) and reaching, with opposing free ends of the clip, on both longitudinal sides of the strip for holding the heated wire (9) in snap lock attachment.

5 Claims, 2 Drawing Sheets

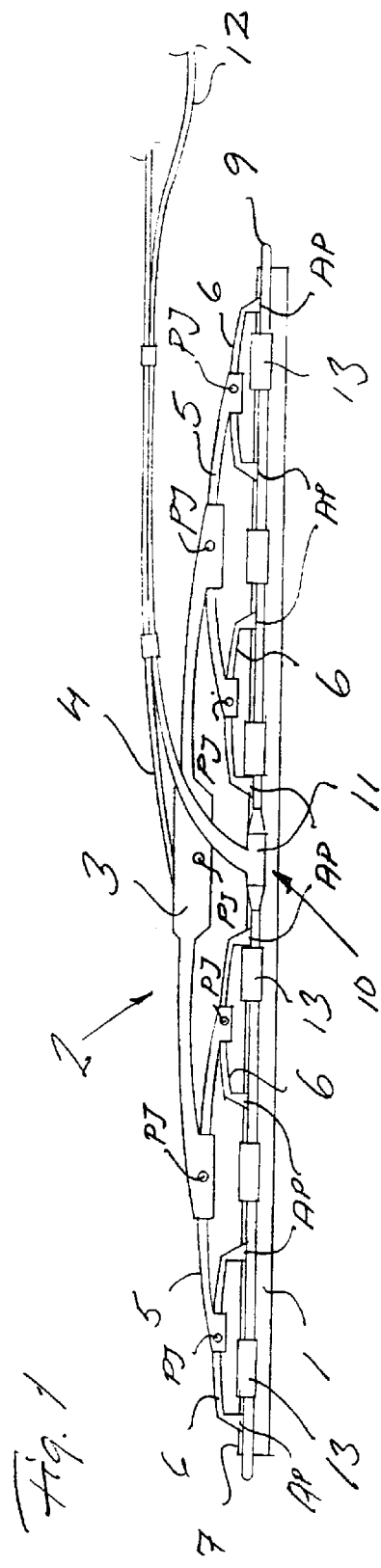
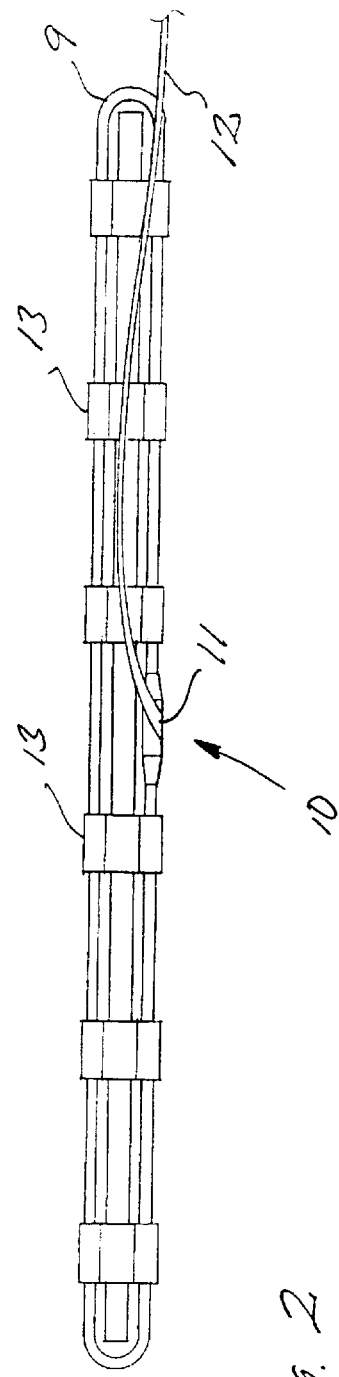

HEATED WINDSHIELD WIPER

TECHNICAL BACKGROUND

This invention relates to improvements in windshield wipers and particularly to a heater mechanism for use in combination with conventional windshield wipers to prevent ice and snow from building up on the wiper during winter driving conditions.

Driving in winter conditions, specifically in falling snow at temperatures below or near the freezing point, often causes the problem of snow and ice building up and thus stiffening the wiper arm mechanism. In the conventional windshield wiper, a flexible rubber strip is attached to an articulated wiper arm designed to accommodate to the curvature of the windshield. The conventional wiper arm of a personal transport vehicle typically includes a main beam that is pivotally linked to a mover arm, driven by a motor for reciprocating, pivotal movements on a motor shaft. A secondary wiper beam is pivotally linked to each end of the main beam, each said secondary beam pivotally carrying a rubber strip holder in each end of the secondary beam. The rubber strip holder is typically arched and attaches with the ends thereof to a metal rail, clamped about the profiled backside of the rubber strip. Thus, the conventional wiper arm mechanism typically includes seven (7) pivot joints, and eight (8) attachment points with the flexible rubber strip.

The ability of the wiper rubber strip to accommodate to the windshield curvature in order to clear the glass surface from snow, ice and water is thus crucially depending on the flexibility of the wiper arm. It is therefore of major importance that the pivot joints and attachments are kept free from ice, that would severely affect and reduce this flexibility, and thus the operation of the wiper.

PRIOR ART

In U.S. Pat. No. 3,034,166 (Bell) there is disclosed a windshield wiper having a heated wire supported on each side of the wiper rubber strip. Electricity is supplied to resistance wire elements via connections arranged at the wire ends, near the lower end of the wiper arm. The heated wires are arranged in metal clips that are clamped to the backside of the rubber strip, the clips carrying the wires in close relation to the sliding contact edge of the rubber strip. The object of the heated wires of U.S. Pat. No. 3,034,166 is to radiate heat to be received by the windshield glass, and thus keeping the surface free from ice. To achieve this object, the heated wires are separately supported by clamps or connectors formed to secure the heated wire in close relation to the external glass surface, which is accomplished by forming the clamps with smooth riding surfaces that are in sliding contact with the glass surface.

The heated wiper of U.S. Pat. No. 3,034,166 is thus not designed for, nor effective for heating and thawing the pivot joints and attachments of the articulated wiper arm. Another obvious drawback of the cited heated wiper is the potential risk of the connector elements scratching the windshield glass. Yet another drawback of the cited wiper is the location of the power connections at the lower end of the wiper arm, so that the connected power leads are unduly exposed in the lengths thereof.

OBJECT OF INVENTION

An object of this invention is to provide a heater mechanism that is attachable to a conventional windshield wiper for radiating heat to the mechanical joints and attachments of the articulated wiper arm in order to prevent ice and snow from building up and thereby reducing it's flexibility and ability to accommodate to the curvature of the windshield.

Another object is to provide a heater mechanism that is readily installed on a conventional windshield wiper without affecting or reducing it's flexibility and ability to accommodate to the curvature of the windshield.

Yet another object is to provide a heater mechanism that is readily installed on a conventional windshield wiper by being snapped into connector elements reaching out from opposite sides of the wiper to secure the heater mechanism at a level near the backside portion of the wiper rubber strip.

These and other objects are met in a heater mechanism for a windshield wiper as defined by the appended claims. Further advantageous embodiments of the heater mechanism are defined in the subclaims.

SUMMARY OF THE INVENTION

A heater mechanism for a windshield wiper is disclosed, wherein an integral, electrically supplied heat radiating wire is arranged to run about the length of the wiper, from a longitudinally central area along a first side of the wiper and turning around a first end, along a second side of the wiper and turning around an opposite, second end back to the longitudinal center of said first side of the wiper. The heated wire is electrically supplied through connectors attached to the wire in said central area of the wiper, where also the wiper main beam is pivotally supported on a mover arm. Power supply leads are guided along said mover arm into the body of the vehicle.

The heated wire is supported by saddle clips that are formed to engage the upper, backside portion of the flexible wiper strip. The clips are formed to receive the profile of the strip, and by snapping on to the strip, the clips extend on both sides thereof so as to carry the heated wire at a level near said backside portion of the strip. On both sides of the wiper, the clips are formed in the ends thereof for a snap lock attachment of the heated wire.

DRAWINGS

The invention will be more closely described below, reference being made to the accompanying, diagrammatic drawings, wherein:

FIG. 1 is a side view showing a conventional windshield wiper equipped with the heater mechanism of the invention;

FIG. 2 is a top view showing the heater mechanism;

DETAILED DESCRIPTION

Figure 3:
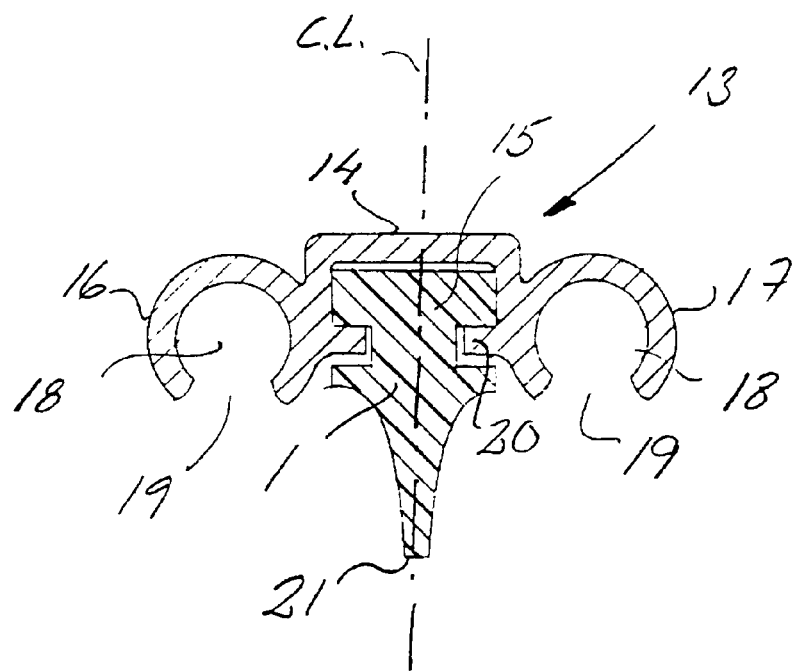
FIG. 3 is an end view showing a clip for snap lock attachment of the heater mechanism of the invention.

Referring to the drawings, a preferred embodiment of the heater mechanism according to this invention will be disclosed.

A windshield wiper of conventional structure is shown in FIG. 1. In the conventional windshield wiper, a strip 1 of a flexible material such as rubber is attached to an articulated wiper arm designed to accommodate to the curvature of the windshield. The conventional wiper arm 2 typically comprises a main beam 3 that is pivotally linked to a mover arm 4, driven by a motor (not shown) for reciprocating, pivotal movements on a motor shaft (also not shown). A secondary wiper beam 5 is pivotally linked to each end of the main beam, each said secondary beam pivotally carrying a strip holder 6 in each end of the secondary beam 5. The strip holder 6 is typically arched and attaches with the ends thereof to hold a backside portion of the flexible strip 1 in sliding engagement with the articulated arm structure. A metal rail 7 (see also FIG. 4) is commonly arranged to be engaged by the strip holders 6. Thus, the conventional windshield wiper arm typically includes seven (7) pivot joints PJ, and eight (8) attachment points AP with the flexible strip. The design provides for a laterally stable and longitudinally flexible structure, both characteristics which are crucial for the wipers ability to secure good visibility through the windscreen when driving in rain and snowfall.

In modern cars, vans, buses and lorries, an air operated defroster function is normally effective to keep ice and snow from the windscreen in combination with the windscreen wiper. In certain conditions, such as rain and snowfall near freezing point temperatures, ice and snow tends to build up on the wiper arm and blocks the mobility of pivot joints and attachments. When the flexibility of the wiper arm is thus reduced, the wiper is no longer able to fully accommodate to the windscreen curvature, leaving areas that are not fully cleaned by the wiper strip. At such conditions, an accelerated build up of ice in these areas may further reduce the operation of the wiper, and reduce the visibility through the windscreen.

This problem may be substantially reduced by the heated wiper mechanism as disclosed below.

Returning to FIG. 1 in combination with FIG. 2, a closed loop, electrically supplied heat radiating wire 9 is arranged to run about the length of the wiper, from a longitudinally central area 10 along a first side of the wiper and turning around a first end, along a second side of the wiper and turning around an opposite, second end back to the longitudinal center 10 of said first side of the wiper. The heated wire 9 is electrically supplied through connector 11 attached to the wire in said central area of the wiper, where also the wiper main beam 3 is pivotally supported by the mover arm 4. Power supply leads 12 are guided along said mover arm 4 into the body of the vehicle.

The heated wire 9 preferably comprises a flexible tubing 9 made from a synthetic material such as Teflon®, surrounding an electric resistance wire that is dimensioned to be power supplied from the vehicle's internal electrical system. The wire exits from the tubing 9 through the connector 11, where power supply leads 12 connects the resistance wire to the power source.

The heated wire 9 is supported by saddle formed clips 13 (see also FIG. 3) that are formed to engage the upper, backside portion of the flexible wiper strip 1. The clip 13 is formed to engage the sectional profile of the strip 1, and to be snap fastened to the backside portion thereof. In snapped on position, each clip extends on both sides of the strip so as to carry the heated wire at a level near said backside portion of the strip. On both sides of the wiper, the clip 13 is formed with snap lock means for a snap lock attachment of the heated wire.

The clip 13, shown diagrammatically in FIG. 3, has a sectional profile wherein a left hand half of the clip 13 is a mirrored image of the right hand half as related to a longitudinal center CL of the clip 13. In snapped on position, a saddle portion 14 runs transversely over the reinforced backside portion 15 of the strip 1. In opposing free ends thereof, the saddle portion 14 carries a snap lock means 16 and 17, respectively, on each longitudinal side of the backside portion 15. The snap lock means 16,17 are each formed to encircle a seat 18, having an entrance 19 that is dimensioned for insertion and a snap lock attachment of the heated wire 9. The entrance 19 opens on the side of the seat 18 that is directed towards the windscreen for insertion of the heated wire from underneath the wiper.

In opposing sides thereof, the snap lock means 16 and 17 are externally formed with projections 20 extending longitudinally the entire length of the tube-shaped snap lock formations 16 and 17. In snapped on position of the clip 13, the projections 20 inserts in longitudinal grooves formed in an upper, reinforcing portion of the sectional profile of the flexible strip 1. In snapped on position, the clip 13 will not impair on the lateral flexibility of the sweeping tip 21 of the strip 1, and the heated wire 9 will be supported at a level near the backside portion of the strip.

Preferably, the clip 13 is manufactured from a synthetic material, plastic, or a non-corrosive metal/alloy metal. The clip 13 is most advantageously produced by extruding a synthetic material, which is then cut to lengths of approximately 0.25 to appr. 1.0 inches (appr. 6 to 24 mm).

Figure 4:
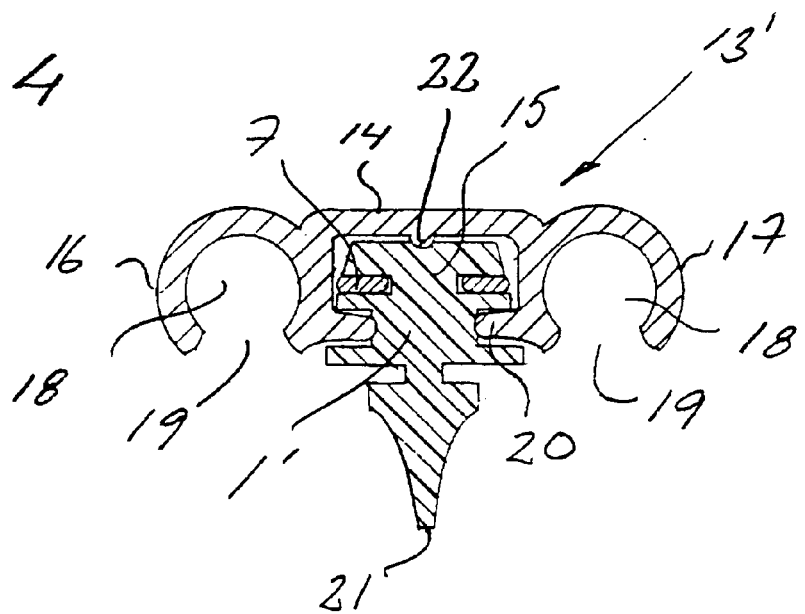
FIG. 4 is an end view corresponding to FIG. 3, showing a modified clip.

A modified clip 13' is shown in FIG. 4. The clip 13' has a saddle portion 14 transversely engaging the backside portion 15 of a conventional windshield wiper strip 1'. Metal rails 7 are seated in the strip 1' for guiding the attachments AP of the articulated wiper arm in sliding engagement with the strip 1'. Snap lock means 16,17 are arranged in the opposing ends of the saddle portion 14 to provide seats 18 for a heated wire (not illustrated in FIG. 4). The heated wire is thus supported on each side of the wiper strip 1' at a level near the backside portion 15 of the wiper strip, and more specifically, close to the metal rails 7. The heat radiated from the heated wire accumulates in the rails 7 to prevent ice from obstructing the sliding engagement, which is necessary for maintaining the longitudinal flexibility of the windshield wiper. Longitudinal ridge 22, as well as projections 20 are formed on the clip 13' to provide operative engagement with the sectional profile of the flexible wiper strip 1'.

Other modifications are possible, and may comprise embodiments where the heated wire is supported also at levels slightly above the upper, backside surface of the flexible strip. Other embodiments may also include a heated wire supported at varying levels as seen in the longitudinal direction, e.g. in a wave-formed layout in a side view representation. Though not specifically shown in the drawings, the scope of protection as defined by the appended claims should be understood to incorporate any such embodiment, where the heated wire is applied to secure an ice-free, flexible operation of the articulated arm of a windshield wiper for any vehicle at land, see or air.

What is claimed is:

1. A heated wiper mechanism, arranged to prevent ice from building up on an articulated wiper arm structure of a vehicle windshield wiper carrying a flexible strip (1,1'), the heated mechanism comprising an electrically supplied, heat radiating wire (9) supported on said windshield wiper, characterized in that said heat radiating wire (9) is an integral, closed loop electrical resistance wire enclosed by a flexible tubing;

the heat radiating wire (9) being supported at a level near an upper, backside portion (15) of the strip (1,1') for radiating heat to the articulated wiper arm structure, and the wire (9) being supported by saddle-shaped clips (13,13') engaging the sectional profile of the backside portion of the strip (1,1') and reaching, with opposing free ends of the clip, on both longitudinal sides of the strip for holding the heated wire (9) in snap lock attachment.

2. The heated wiper mechanism of claim 1, wherein the heated wire (9) is seated in snap lock means (16,17) arranged in the free, opposing ends of the clip (13,13') to receive the heated wire in seats (18), accessible through openings that are facing towards the windshield.

3. The heated wiper mechanism of claim 2, wherein the clip (13,13') is longitudinally formed with projections (20, 22) that engage the sectional profile of the strip (1,1') in snapped on position of the clip.

4. The heated wiper mechanism of claim 1, wherein the wire (9) is electrically supplied through a connector means (11) that is arranged, relative to the longitudinal direction of the wiper, near a pivotal attachment of the wiper to a mover arm.

5. The heated wiper mechanism of claim 1, wherein the loop-shaped heated wire (9) is electrically supplied through a connector means (11) arranged in a longitudinal center (10) on a first side of the wiper; the heated wire (9) running integral from said connector means (11) along a first side of the wiper and turning around a first end thereof; along a second side of the wiper and turning around an opposite, second end thereof; and returning along said first side to the connector means (11) in the longitudinal center 10 of said first side of the wiper.

* * * * *